(12) United States Patent
Cuffaro et al.

(10) Patent No.: US 6,690,951 B1
(45) Date of Patent: Feb. 10, 2004

(54) DYNAMIC SIZE ALLOCATION SYSTEM AND METHOD

(75) Inventors: Angelo Cuffaro, Pierrefonds (CA); Hanan Ahmed, Pierrefonds (CA)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 09/467,713

(22) Filed: Dec. 20, 1999

(51) Int. Cl.$^7$ ................................................ H04B 1/38
(52) U.S. Cl. ...................... 455/560; 455/3.01; 370/229
(58) Field of Search ................................ 455/560, 3.01, 455/3.03, 3.04, 956, 9; 370/229, 230, 230.1, 252, 241

(56) References Cited

U.S. PATENT DOCUMENTS

| | | | |
|---|---|---|---|
| 5,541,912 A | | 7/1996 | Choudhury et al. .......... 370/17 |
| 5,561,846 A | * | 10/1996 | Hagio ........................ 370/337 |
| 5,588,138 A | | 12/1996 | Bai et al. ................ 395/497.04 |
| 5,802,040 A | * | 9/1998 | Park et al. .................. 370/232 |
| 5,867,482 A | * | 2/1999 | Kobayashi ................. 370/252 |
| 5,959,991 A | * | 9/1999 | Hatono et al. ............ 370/235.1 |
| 6,064,661 A | * | 5/2000 | Benn ........................... 370/329 |
| 6,118,761 A | * | 9/2000 | Kalkunte et al. ............ 370/229 |
| 6,215,768 B1 | * | 4/2001 | Kim ............................ 370/230 |

FOREIGN PATENT DOCUMENTS

| | | |
|---|---|---|
| DE | 19726101 A1 | 6/1997 |
| EP | 0273612 A2 | 12/1987 |
| EP | 0817044 A2 | 6/1997 |
| WO | WO00/38468 | 6/2000 |

* cited by examiner

*Primary Examiner*—Congvan Tran
(74) *Attorney, Agent, or Firm*—Smith & Danamraji, P.C.

(57) ABSTRACT

A system and method of dynamically allocating memory records to a plurality of blocks in a telecommunications switch. A data acquisition monitor is provided for monitoring one or more traffic pattern parameters associated with the call traffic through the telecommunications switch. An analyzer analyzes the traffic pattern information and maintains traffic parameter profiles in a suitable database. Also, the analyzer determines if there exists a change in demand of service based on the monitored traffic pattern parameters. A command generator provides a feedback signal to the telecommunications switch to re-assign memory records based on the changes in demand of service.

16 Claims, 4 Drawing Sheets

DYNAMIC SIZE ALLOCATION SYSTEM AND METHOD

BACKGROUND OF THE INVENTION

1. Technical Field of the Invention

The present invention relates to telecommunications networks and, more particularly, to a system and method for dynamically allocating memory resources based upon call traffic demand within a telecommunications network node such as a switch.

2. Description of Related Art

Switching nodes such as, for example, Mobile Switching Centers (MSCs), of a telecommunications network are typically provided with a plurality of blocks for handling call traffic that passes therethrough. Each block manages a particular function/aspect of the ongoing calls that comprise the traffic and, typically, is assigned a plurality of memory spaces for this purpose.

Telecommunications switches often require optimal allocation of resources such as available memory or bandwidth for reliable and/or efficient communications or to maximize channel capacity. A conventional approach is to use all of the available memory or bandwidth in a fixed manner, as memory and bandwidth are generally limited in a network. However, it should be readily realized that such an approach results in an inefficient use of the resources because in fixed or static resource allocation methods, memory gets tied up with a particular component, hardware or software, even when it is not needed.

In contrast, a dynamic memory allocation scheme treats available memory as a global resource pool and entities requiring memory are assigned only the amount that is needed. Although several such schemes exist, the current implementations have various drawbacks and deficiencies. For example, known dynamic memory allocation methods, which are typically controlled by a central processor that is responsible for memory management, do not respond fast enough with respect to the changes in a system such as a telecommunications switch. Moreover, even where available, the capacity of such methods—the ability and/or intelligence—is rather limited, thereby still requiring laborious manual intervention in order to adjust the allocated memory size to suit the changing needs of the system.

Based on the foregoing, it should be apparent that there has arisen an acute need for a reliable and robust dynamic memory allocation system for use within a telecommunications switch which advantageously overcomes the shortcomings and deficiencies of the current schemes. The present invention provides such a solution.

SUMMARY OF THE INVENTION

In one aspect, the present invention is directed to a resource allocation system for use with a telecommunications switch wherein call traffic is handled via a plurality of blocks. Each block is initially assigned a number of memory records for managing the call traffic. A data acquisition monitor is provided for gathering data on one or more traffic pattern parameters associated with the call traffic. An analyzer coupled to the monitor analyzes the gathered data and maintains a database profile with respect to the traffic pattern parameters. Also, the analyzer computes a demand of service for each of the blocks based on the traffic pattern parameters. The resource allocation system further comprises a command generator coupled to the analyzer, wherein the command generator provides one or more feedback commands to the telecommunications switch in response to an indication of a change in the demand of service received from the analyzer. Preferably, the feedback commands operates to effectuate a change in the number of records assigned to the blocks based on the change in the demand of service.

In another aspect, the present invention is directed to a resource allocation method for use with a telecommunications switch wherein call traffic is handled via a plurality of blocks. The method initially assigns a plurality of memory records to each of the blocks for handling the call traffic. Thereafter, one or more traffic pattern parameters associated with the call traffic are monitored. The traffic pattern information is analyzed and changes in demand of service are then computed. The memory records are dynamically re-assigned to the blocks based upon the changes in demand of service.

BRIEF DESCRIPTION OF THE DRAWINGS

A more complete understanding of the present invention may be had by reference to the following Detailed Description when taken in conjunction with the accompanying drawings wherein.

DETAILED DESCRIPTION OF EMBODIMENTS

Figure 1:
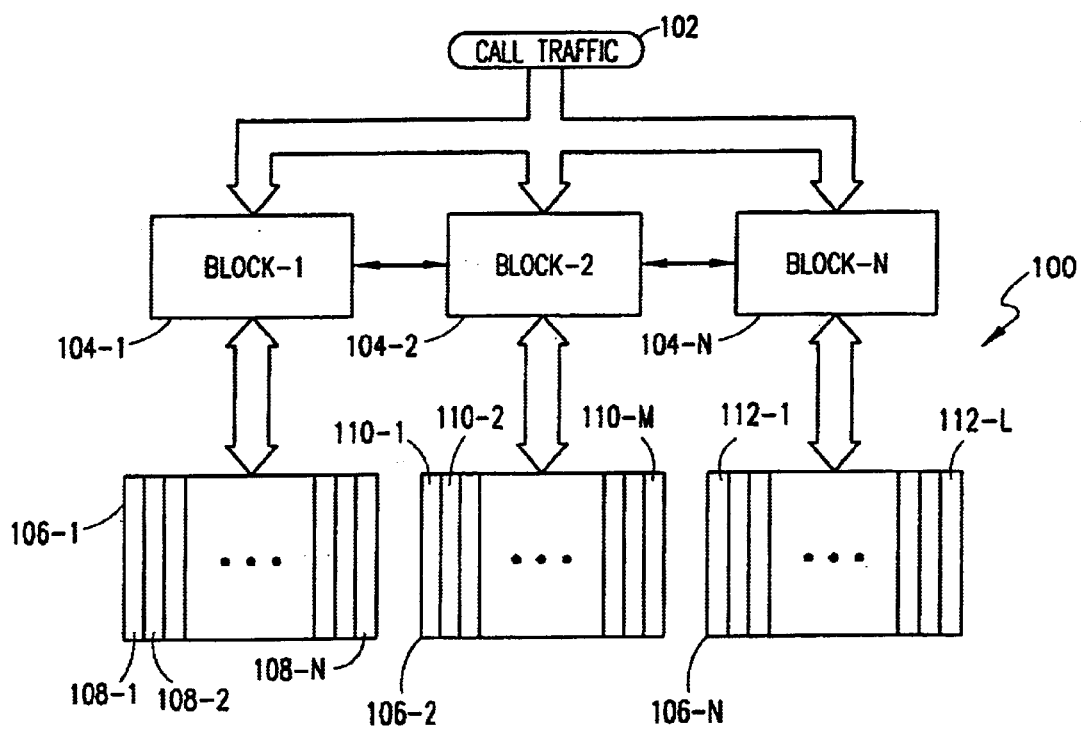
FIG. 1 depicts a functional block diagram of a memory allocation system in a telecommunications switch wherein the teachings of the present invention may be advantageously employed.

In the drawings, like or similar elements are designated with identical reference numerals throughout the several views, and the various elements depicted are not necessarily drawn to scale. Referring in particular to FIG. 1, depicted therein is a functional block diagram of a memory allocation system 100 in a telecommunications switch wherein the teachings of the present invention may be advantageously employed. Call traffic 102 through the telecommunications switch is managed by a central processor (not shown) by allocating memory resources for handling the traffic. The memory allocation system 100 in the telecommunications switch is preferably based on the concept of blocks and records. A block in the telecommunications switch performs a particular function, for example, call supervision, call setup, et cetera.

In the exemplary embodiment shown in FIG. 1, a plurality of blocks, Block-1 104-1 through Block-N 104-N, are shown. The blocks, which communicate with one another through appropriate signals, hold information pertaining to each call handled in the telecommunications switch. The data about the calls in the switch is held in a record of a data file. Accordingly, each record (or individual unit) holds information about one call with respect to a specific aspect thereof. Depending on its function, each block is allocated a certain number of records for handling the call traffic. For example, Block-1 104-1 is allocated a data file 106-1 having N individual records, 108-1 through 108-N. Similarly, Block-2 104-2 is allocated M individual records, 110-1 through 110-M, in its data file 106-2.

In a presently preferred exemplary embodiment of the present invention, for example, one of the blocks (known as the MCHC block) is provided for handling the call supervision function. Typically, every time a call is established, it seizes a record for that call. Accordingly, it should be realized that at any given time, the number of records seized by the MCHC block may correspond to the number of simultaneous calls that are ongoing and may, therefore, be deemed to be an indication of the amount of traffic in the telecommunications switch. Since the memory resources (in the form of available records) are fixed and/or limited, the memory allocated to each block of the telecommunications switch needs to be appropriately dimensioned for efficiently managing the records.

Figure 2A:
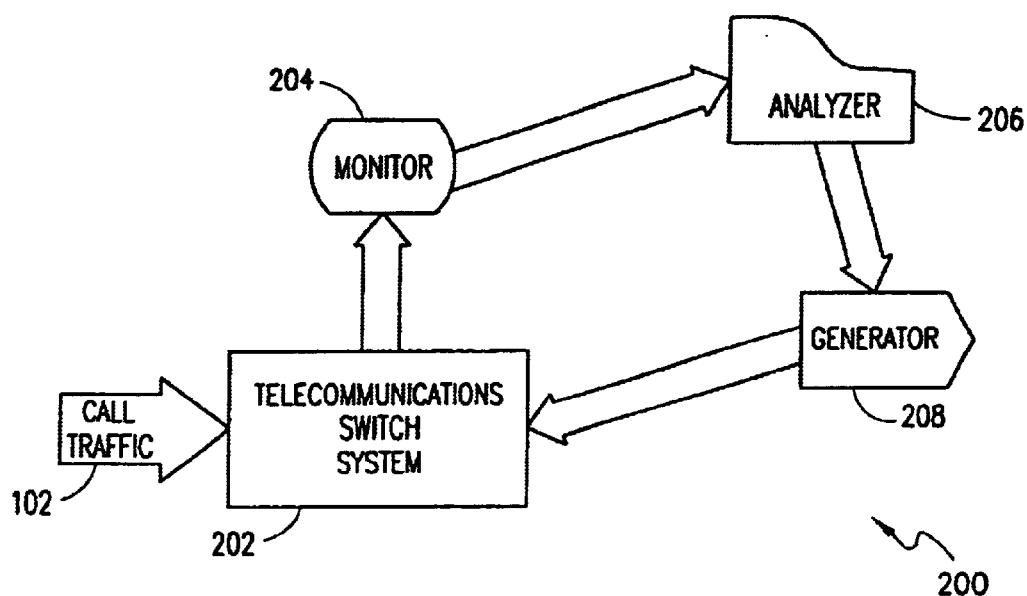
FIG. 2A depicts a functional block diagram of a dynamic size allocation system in accordance with the teachings of the present invention.

FIG. 2A depicts a functional block diagram of a dynamic size allocation system 200 provided in accordance with the teachings of the present invention. Call traffic 102 in a telecommunications switch system 202 is monitored over a period of time to build a history of relevant traffic pattern parameters. A monitor 204 is provided for this purpose. It should be realized that any suitable parameter associated with the traffic pattern may be used for monitoring purposes and, further, the monitoring period may be variable, fixed, predetermined, or any combinations thereof. Some of the traffic pattern parameters for monitoring may comprise, for example, holding time, service type (data, speech, et cetera), time of day, etc.

Based on the initial history of the traffic pattern, each of the blocks in the telecommunications switch 202 is assigned an amount of records which corresponds to the demand of service with respect to that block (that is, a Size Alteration Event or SAE assigned to the block). The incoming call traffic continues to be monitored after the SAEs are assigned to the blocks and the collected traffic pattern data is provided to an analyzer 206 which analyzes the data and determines if there exist any changes in the demand of service, preferably based on the rate of service request (that is, seizure and release of block records), for the blocks disposed in the telecommunications switch system 202. Various types of mathematical formulas or other devices may be employed for statistically analyzing the traffic pattern data and may preferably depend on the function of the block and the way the records are seized and released therefor. Preferably, the analyzer 206 provides indications of: (i) short-term changes in demand (e.g., those associated with a special event—such as a sporting event, for instance—that occurs in the service area of the switch 202); (ii) long-term changes in demand (for example, increase in the subscriber base); and (iii) fixed patterns over a short- or long-term (e.g., changes in vacation spots or other geographic areas having bi-modal or multi-modal demands).

Continuing to refer to FIG. 2A, results obtained from the demand analyses such as those set forth above are provided to a generator 208 which, in turn, provides one or more commands to the telecommunications switch system 202. These commands operate to adjust the allocation of memory resources, i.e., the order of records (or re-assigned SAEs) associated with the traffic blocks in the switch.

Figure 2B:
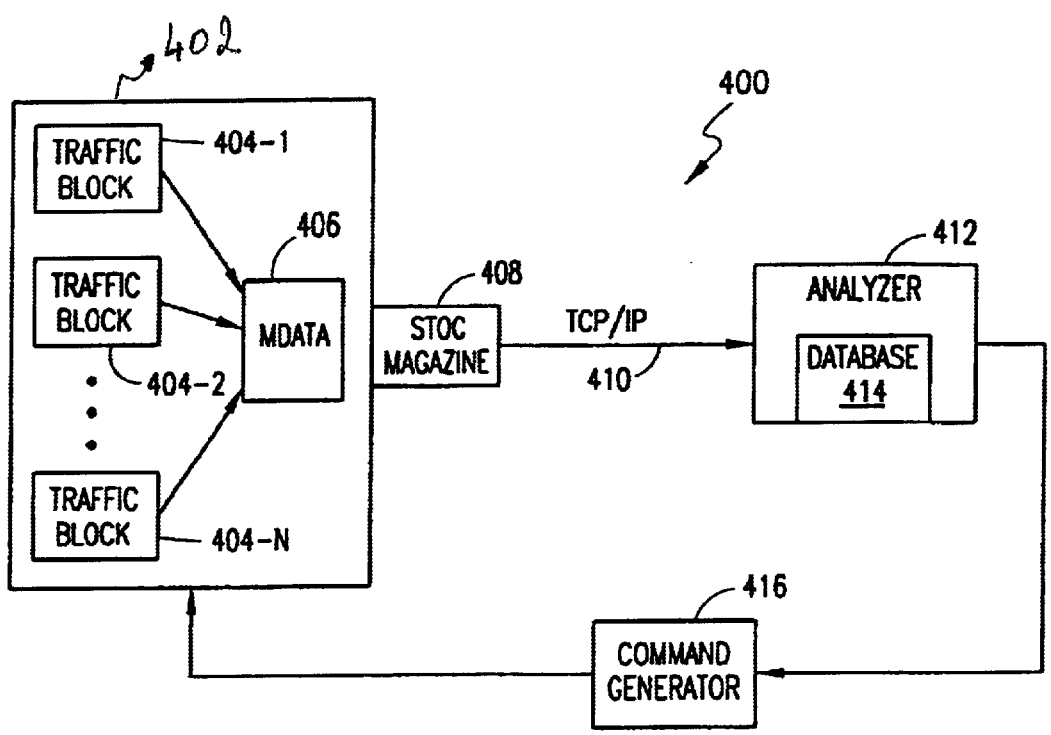
FIG. 2B depicts a functional block diagram of a presently preferred exemplary embodiment of a dynamic size allocation system.

FIG. 2B is a functional block diagram of a presently preferred exemplary embodiment of a dynamic size allocation system 400 provided in accordance herewith. A plurality of traffic blocks, having reference numerals 404-1 through 404-N, are provided in a cellular telecommunications switch 402 for managing the call traffic therethrough. A data-gathering block, MDATA 406, is provided in the switch 402 for the purpose of monitoring/gathering traffic pattern data (i.e., demand of service data) for the traffic blocks. A STOC (Signaling Terminal for Open Communications) magazine 408 is provided with the cellular telecommunications switch 402 for effectuating a real-time data acquisition interface via a path 410, such as a TCP/IP path, disposed between the switch 402 and an analyzer 412. Preferably, a suitable database 414 is provided with the analyzer 412 for maintaining and managing historical patterns of the traffic pattern parameters, and for storing other appropriate information used in calculating indications of demand changes. Responsive to the indications from the analyzer 412, a command generator 406 operates to provide suitable feedback signals (i.e., commands) to the cellular telecommunications switch 402. In response to the commands provided by the command generator 416, the SAEs (i.e., record sizes) of the traffic blocks are dynamically re-allocated to reflect the changes in the demand of service. Those skilled in the art should realize upon reference hereto that the feedback loop (for re-allocation of memory) may preferably be done automatically through the use of an interface such as a Man-Machine Language (MML) interface.

Figure 3:
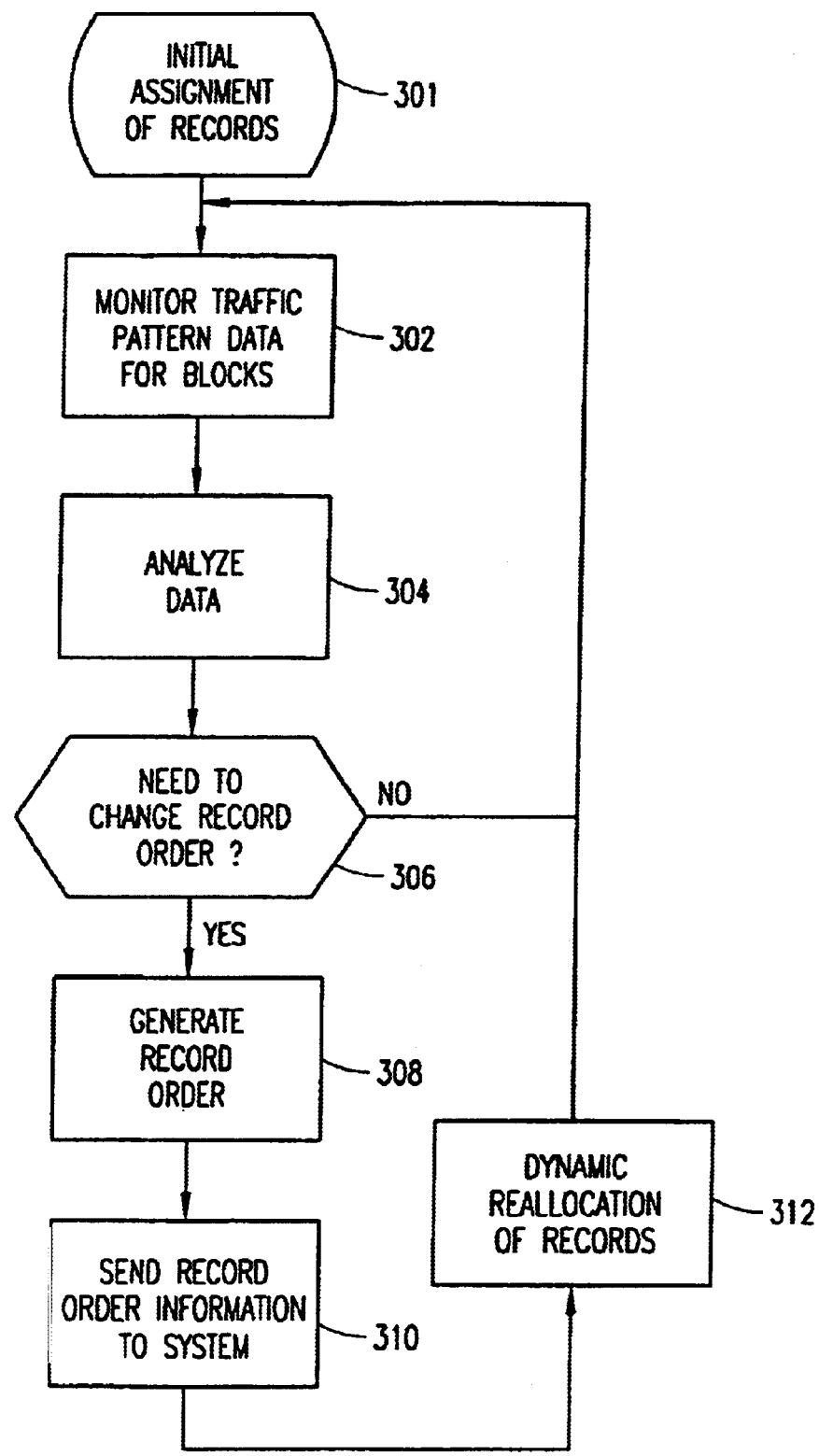
FIG. 3 depicts a flow chart of an exemplary embodiment of a dynamic size allocation method in accordance with the teachings of the present invention.

Referring now to FIG. 3, depicted therein is a flow chart of an exemplary embodiment of a dynamic size allocation method in accordance with the teachings of the present invention. After initially assigning record sizes (SAEs) to traffic blocks in a telecommunications switch (step 301), various traffic pattern parameters associated with the traffic blocks are monitored (step 302) in order to determine changes in demand of service. The monitored data is then analyzed (step 304). Thereafter, a determination is made if the record order of the traffic blocks needs to be changed based on the changes in demand of service (decision block 306). If so, a record re-order command is generated (step 308) which is forwarded to the telecommunications switch (step 310). In response, the SAEs (or the record sizes) of the traffic blocks are dynamically re-allocated. Although the initial SAE assignments may be effectuated in any manner in accordance with a particular implementation, those skilled in the art should realize that such SAE assignments may preferably be based on a prior history of the traffic patterns associated with the telecommunications switch's call traffic.

Based on the foregoing, it should be appreciated that the present invention advantageously provides a real-time traffic pattern data acquisition system for calculating changes in demand of service and appropriately re-allocating memory resources among the traffic blocks of a telecommunications switch. By dynamically re-allocating SAEs of the traffic blocks, the present invention overcomes the deficiencies in the current processor-based memory allocation schemes such as manual intervention and associated downtime and cost, etc. Moreover, memory resources are optimally allocated to suit different traffic conditions and demands. In addition, because service providers are typically charged based on how many records are allocated to their call traffic, costs may be advantageously minimized by better resource management afforded by the present invention.

Further, it is believed that the operation and construction of the present invention will be apparent from the foregoing Detailed Description. While the method and system shown and described have been characterized as being preferred, it should be readily understood that various changes and modifications could be made therein without departing from the scope of the present invention as set forth in the following claims.

What is claimed is:

1. A resource allocation method for use with a telecommunications switch wherein call traffic is handled via a plurality of blocks, comprising the steps of:

initially assigning a plurality of memory records to each of the blocks;

monitoring one or more traffic pattern parameters associated with the call traffic;

analyzing the traffic pattern parameters and computing changes in demand of service associated with the blocks; and dynamically re-assigning the memory records to the blocks based upon the changes in demand of service.

2. The resource allocation method as set forth in claim 1, wherein each block is initially assigned an equal number of memory records.

3. The resource allocation method as set forth in claim 1, wherein each block is initially assigned a different number of memory records.

4. The resource allocation method as set forth in claim 1, wherein the traffic pattern parameters monitored comprises one or more short-term parameters.

5. The resource allocation method as set forth in claim 1, wherein the plurality of memory blocks initially assigned to a block represents the block's initial Size Alteration Event.

6. The resource allocation method as set forth in claim 1, wherein the traffic pattern parameters monitored comprises one or more long-term parameters.

7. The resource allocation method as set forth in claim 1, wherein the initial assignment of memory records is based on the call traffic's prior history.

8. The resource allocation method as set forth in claim 7, wherein the call traffic's prior history comprises a set of data gathered on the traffic pattern parameters over a selected period of time.

9. The resource allocation method as set forth in claim 8, wherein the selected period of time comprises a week.

10. A resource allocation system for use with a telecommunications switch wherein call traffic is handled via a plurality of blocks and each block is initially assigned a number of memory records, comprising:

a monitor for gathering data on one or more traffic pattern parameters associated with the call traffic;

an analyzer coupled to the monitor, the analyzer for analyzing the gathered data and maintaining a statistical database profile with respect to the traffic pattern parameters, wherein the analyzer computes a demand of service for each of the blocks based on the traffic pattern parameters; and a command generator coupled to the analyzer, wherein the command generator provides one or more commands to the telecommunications switch responsive to an indication of a change in the demand of service received from the analyzer, the commands operating to effectuate a change in the number of records assigned to the blocks corresponding to the change in the demand of service.

11. The resource allocation system as set forth in claim 10, wherein the monitor is coupled to the telecommunications switch via a real-time data acquisition interface.

12. The resource allocation method as set forth in claim 1, wherein the traffic pattern parameters comprise short-term parameters.

13. The resource allocation method as set forth in claim 1, wherein the traffic pattern parameters comprise long-term parameters.

14. The resource allocation method as set forth in claim 1, wherein the analyzer computes the demand of service based on the block's type.

15. A dynamic resource allocation system, comprising;

means for monitoring a plurality of traffic pattern parameters associated with call traffic through a telecommunication switch, wherein the call traffic is handled through a plurality of blocks, each block having a number of records;

means for analyzing the traffic pattern parameters and determining a change in demand of service associated with the blocks; and means for generating a record re-order command responsive to an indication provided by the analyzer corresponding to the change in demand of service, wherein the record re-order command is provided to the telecommunications switch to change the number of records assigned to the blocks.

16. The dynamic resource allocation system as set forth in claim 15, wherein the telecommunications switch comprises a cellular telecommunications switch.

\* \* \* \* \*